US012609409B2

(12) United States Patent (10) Patent No.: US 12,609,409 B2
Shimizu et al. (45) Date of Patent: Apr. 21, 2026

(54) BATTERY PACK

(71) Applicant: Panasonic Intellectual Property Management Co., Ltd., Osaka (JP)

(72) Inventors: Keisuke Shimizu, Osaka (JP); Katsushi Ishizaka, Osaka (JP); Chifumi Murayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 848 days.

(21) Appl. No.: 17/914,186

(22) PCT Filed: Mar. 30, 2021

(86) PCT No.: PCT/JP2021/013529
§ 371 (c)(1),
(2) Date: Feb. 2, 2023

(87) PCT Pub. No.: WO2021/200941
PCT Pub. Date: Oct. 7, 2021

(65) Prior Publication Data
US 2023/0207955 A1    Jun. 29, 2023

(30) Foreign Application Priority Data

Mar. 31, 2020    (JP) ................................ 2020-063647
Mar. 31, 2020    (JP) ................................ 2020-063657
Mar. 31, 2020    (JP) ................................ 2020-063666

(51) Int. Cl.
*H01M 10/613*      (2014.01)
*H01M 10/6556*     (2014.01)
*H01M 50/204*      (2021.01)
*H01M 50/358*      (2021.01)

(52) U.S. Cl.
CPC ....... *H01M 50/358* (2021.01); *H01M 10/613* (2015.04); *H01M 10/6556* (2015.04); *H01M 50/204* (2021.01)

(58) Field of Classification Search
CPC ............. H01M 50/358; H01M 10/613; H01M 10/6556; H01M 50/204; H01M 10/052; H01M 10/655; H01M 50/35; H01M 10/643; Y02E 60/10
See application file for complete search history.

(56) References Cited

U.S. PATENT DOCUMENTS

| | | | | |
|---|---|---|---|---|
| 11,437,682 | B2 * | 9/2022 | Takano | ............... H01M 50/367 |
| 2009/0197153 | A1 * | 8/2009 | Fujikawa | .............. H01M 50/30 |
| | | | | 429/82 |
| 2012/0015218 | A1 * | 1/2012 | Lee | ....................... H01M 50/30 |
| | | | | 429/53 |
| 2016/0104923 | A1 * | 4/2016 | Shiotsu | ............... H01M 50/394 |
| | | | | 429/87 |
| 2018/0269448 | A1 * | 9/2018 | Shimizu | .............. H01M 50/342 |
| 2021/0313650 | A1 | 10/2021 | Gondoh | |

FOREIGN PATENT DOCUMENTS

| | | | |
|---|---|---|---|
| JP | 03-134952 | A | 6/1991 |
| JP | 2005-046821 | A | 2/2005 |
| JP | 2009-212081 | A | 9/2009 |
| JP | 2010-277742 | A | 12/2010 |
| JP | 2014-160573 | A | 9/2014 |
| WO | 2015/045404 | A1 | 4/2015 |
| WO | 2020/039722 | A1 | 2/2020 |

OTHER PUBLICATIONS

Partial European Search Report dated Jul. 19, 2024 issued in the corresponding European Patent Application No. 21779543.4.
First Office Action received in counterpart Chinese Patent Application No. 202180023145.1, dated Feb. 29, 2024, with partial English Translation.
The Extended European Search Report issued on Dec. 2, 2024 in the corresponding European Patent Application No. 21779543.4.
International Search Report issued in International Patent Application No. PCT/JP2021/013529 dated Jun. 15, 2021, with English translation.

* cited by examiner

*Primary Examiner* — Muhammad S Siddiquee
(74) *Attorney, Agent, or Firm* — Rimon P.C.

(57) ABSTRACT

A lighting system includes a plurality of lighting fixtures and a terminal device-that controls the plurality of lighting fixtures, wherein: each of the plurality of lighting fixtures transmits, to the terminal device, identification information and acquired information; and the terminal device classifies the plurality of lighting fixtures-on the basis of the information acquired respectively by the plurality of lighting fixtures.

21 Claims, 16 Drawing Sheets

CROSS SECTION B-B

CROSS SECTION B-B

BATTERY PACK

CROSS-REFERENCE OF RELATED APPLICATIONS

This application is the U.S. National Phase under 35 U.S.C. § 371 of International Patent Application No. PCT/JP2021/013529, filed on Mar. 30, 2021, which in turn claims the benefit of Japanese Patent Application No. 2020-063647, filed on Mar. 31, 2020, Japanese Patent Application No 2020-063657, filed on Mar. 31, 2020, and Japanese Patent Application No. 2020-063666, filed on Mar. 31, 2020, the entire disclosures of which Applications are incorporated by reference herein.

TECHNICAL FIELD

The present disclosure relates to a battery pack that houses a secondary battery.

BACKGROUND

A secondary battery such as a lithium-ion battery is used in the form of a battery pack (also referred to as a battery module) in which a plurality of batteries are electrically connected and housed in a case. When there is an abnormality in a battery in such a battery pack, flammable high-temperature gas is generated from the battery. The battery has a safety valve, from which the generated gas is discharged into the battery pack. The battery pack has an exhaust gas duct connected to an exhaust port, via which the gas is discharged to the outside. Here, if the high-temperature flammable gas is discharged to the outside of the battery pack as it is, problems may occur.

Patent Literature 1 discloses providing a foam (heat exchanger) made of metal, resin, or the like at the exhaust port, and lowering the gas temperature by causing the exhaust gas to pass therethrough.

CITATION LIST

Patent Literature

PATENT LITERATURE 1: Japanese Unexamined Patent Application Publication No. H3-134952

SUMMARY

Technical Problem

There is a need to further enhance the reliability of the above-described battery pack that uses a heat exchanger.

The present disclosure provides a battery pack in which reliability can be enhanced.

Solution to Problem

A battery pack according to the present disclosure is a battery pack that houses a secondary battery inside a case, including: an exhaust part, by means of which an internal space of the case where the secondary battery is housed is in communication with outside, and which allows a gas discharged from the secondary battery to be discharged from the internal space to the outside; and a heat exchanger, which is provided at the exhaust part and formed of a porous material having a three-dimensional mesh structure, and through which the gas passes.

Advantageous Effects of Invention

According to the present disclosure, the reliability of the battery pack can be further enhanced.

DESCRIPTION OF EMBODIMENTS

Figure 1:
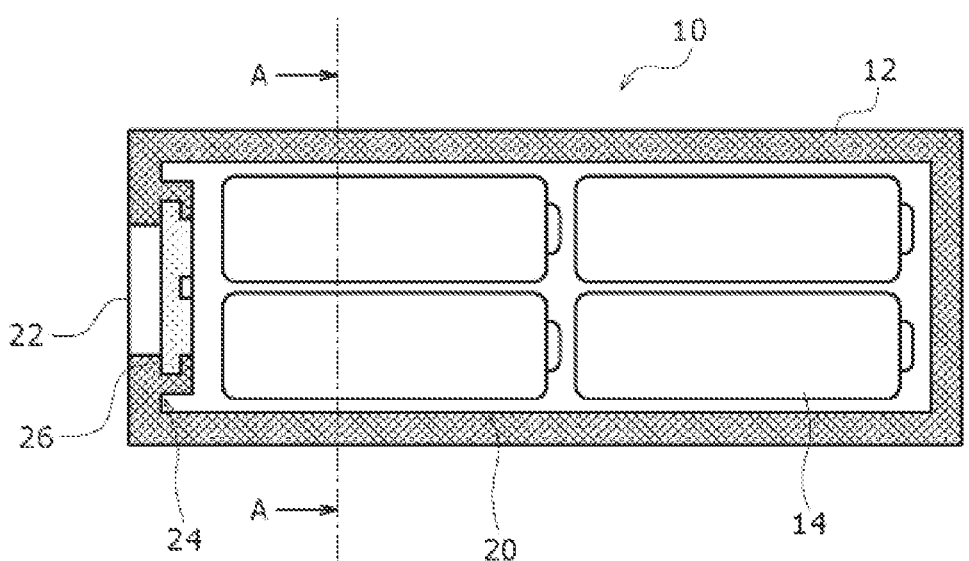
FIG. 1 is a diagram showing an overall configuration of a battery pack according to an example embodiment.

Embodiments of the present disclosure will now be described by reference to the drawings. It should be noted that the present disclosure is not limited to the embodiments described herein. In the following, equivalent elements in all drawings are described by being labeled with the same reference numerals. Further, in the description given by the present text, reference numerals mentioned earlier shall be used again as necessary.

(Overall Configuration of Battery Pack)

FIG. 1 is a diagram showing an overall configuration of a battery pack 10 according to an example embodiment. The battery pack 10 has a box-shaped case 12, and a plurality of batteries 14, the number of which is four in this example, are housed in the case 12. Each battery 14 is a secondary battery, and, for example, a non-aqueous electrolyte secondary battery such as a lithium ion battery is used as the battery 14. The battery 14 has, for example, a cylindrical shape, and has a positive electrode terminal and a negative electrode terminal at respective ends thereof. For example, the battery 14 has an electrode assembly including a positive electrode and a negative electrode, and an outer can that houses the electrode assembly together with an electrolyte. The opening of the outer can may be sealed using a sealing plate together with an insulating gasket. In this case, the outer can may be electrically connected to one of the positive and negative electrodes of the electrode assembly while the conductive sealing plate is connected to the other of the positive and negative electrodes. Each battery 14 may alternatively have a rectangular shape, and the positive electrode terminal and the negative electrode terminal may protrude from one common face of the battery. Further, even when the battery has a cylindrical shape, current collection from the positive electrode terminal and the negative electrode terminal may be performed on the same end side using current collecting members. A current collecting member such as a metal plate may be connected to each of the positive electrode terminal and the negative electrode terminal of the battery 14, and a collective positive electrode terminal and a collective negative electrode terminal may be provided in the case 12. However, illustration of such electrical connection members is omitted in the drawings. The battery pack 10 is used as a power source for various electric devices, and may be a large-capacity battery pack for a large device such as an automobile or a server, or a small-capacity battery pack for a small portable device.

Figure 2:
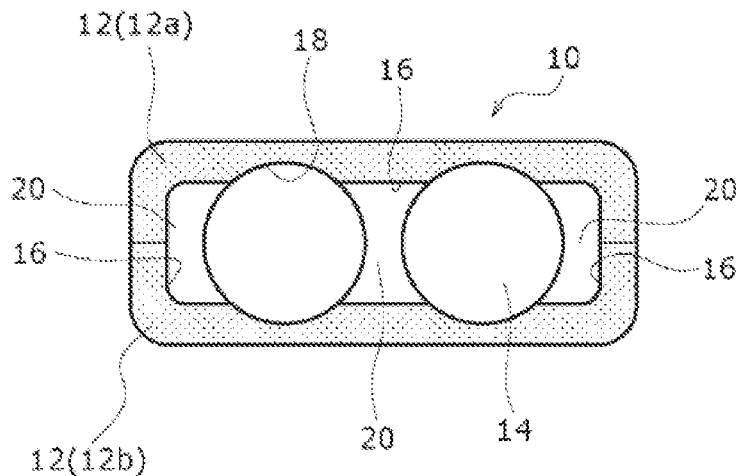
FIG. 2 is a diagram showing cross section A-A in FIG. 1.

FIG. 2 is a cross-sectional view of the battery pack 10 (showing cross-section A-A in FIG. 1). As shown, the case 12 has, in the internal space on the inside of an outer wall 16 formed at its peripheral part, receiving portions 18 corresponding to the size of the batteries 14, and the batteries 14 are housed therein. Between each of the receiving portions 18 and the outer wall 16, an exhaust gas passage 20 is formed, which is an example exhaust part, through which high-temperature gas ejected from the batteries 14 flows at the time of abnormality. In this example, a safety valve is provided at the top part of each battery 14, and the high-temperature gas is discharged from the safety valve at the time of battery abnormality. Further, the case 12 is divided in the height direction into two half cases 12a and 12b, and the entirety of each battery 14 can be covered by placing the half cases 12a, 12b one over the other in a state of facing each other. Regarding the half cases 12a, 12b, only the tips of the outer walls 16 formed at the peripheral parts of the respective half cases 12a, 12b are in contact with each other, and since parts other than the tips of the outer walls 16 are arranged facing while being spaced from each other, this space serves as the exhaust gas passage 20. The half cases 12a, 12b may be configured to abut or engage with each other at portions other than the outer walls 16. In the battery pack 10 of the present disclosure, the exhaust gas passage is not a requisite.

In one side wall of the case 12, an exhaust port 22 is formed, which is an example exhaust part, and on the upstream side of the exhaust port 22, a heat exchanger 24 formed of a porous material having a three-dimensional mesh structure is arranged in a manner blocking the exhaust port 22. In the battery pack 10 of the present disclosure, it is not a requisite for the heat exchanger to be arranged at the exhaust port. In cases where a duct portion is provided, which serves as a gas flow path like the exhaust gas passage, the heat exchanger may be mounted inside the duct portion.

As such, when high-temperature gas is discharged from any of the batteries 14 of the battery pack 10, the high-temperature gas flows through the exhaust gas passage 20, passes through the heat exchanger 24 whereby the temperature is decreased, and is then discharged to the outside from the exhaust port 22.

In this example, each battery 14 has an exhaust outlet (i.e., a safety valve) for high-temperature gas provided at its top part (i.e., near the positive electrode terminal), and the exhaust port 22 is provided in the outer wall 16 on a side toward the bottom parts (i.e., toward the negative electrode terminals) of the four batteries 14. Accordingly, high-temperature gas discharged from the batteries 14 may be cooled by being mixed with air flowing in the exhaust gas passage 20. The exhaust outlet may alternatively be formed at the bottom part of each battery 14, instead of at the top part.

(Heat Exchanger)

The heat exchanger 24 is formed of a porous material having a three-dimensional mesh structure, and particularly from the viewpoint of heat resistance, a porous metal member having three-dimensional continuous pores can for example be used. The porous metal member is, for example, one made of nickel, aluminum, copper, tin, nichrome, or an alloy containing a plurality of metals selected from these metals. In such a porous metal member, metal linear skeleton parts branch out and extend three-dimensionally. These skeleton parts include: window portions, which are openings defined in a predetermined plane by a plurality of linear skeleton parts connected to each other; and cavity portions, which are cavities formed by the plurality of window portions being connected (or integrated) and three-dimensionally surrounded. Here, the ease of movement for a gas to move between adjacent chambers depends on the pore diameter of the openings. The average pore diameter of the window portions of the porous metal member used for the heat exchanger may be 0.2 to 2.0 mm. The specific surface area may be 250 to 5800 $m^2/m^3$. The shape of the heat exchanger is not particularly limited. For example, the heat exchanger may be a sheet having a predetermined thickness, or may alternatively be a block. When the heat exchanger is a sheet, the thickness (as determined based on a remaining part) is, for example, 1 to 10 mm. Further, the porous material having the three-dimensional mesh structure may be a sintered compact made from metal particles, or a woven or non-woven fabric composed of glass fibers. When the temperature of the gas that is to pass through the porous material is not very high, a foam of a thermosetting resin such as urethane may be used.

Figure 3A:
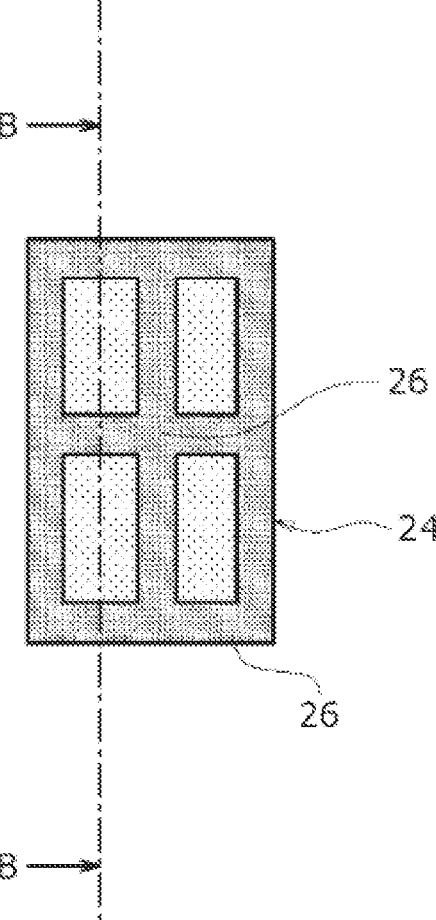
FIG. 3A is a plan view showing an example heat exchanger.
Figure 3B:
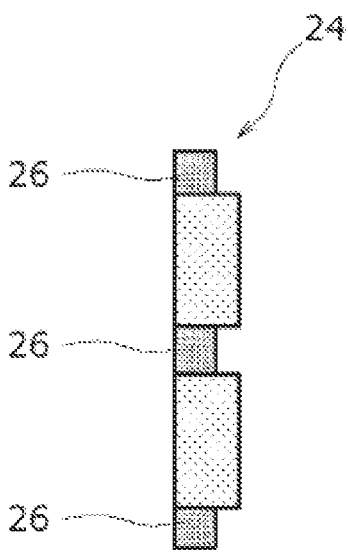
FIG. 3B is a cross-sectional view of the heat exchanger, which is taken along cutting line B-B in FIG. 3A.

FIG. 3A is a plan view showing a configuration of a sheet-like heat exchanger 24, and FIG. 3B is a cross-sectional view of the heat exchanger 24, which is taken along cutting line B-B in FIG. 3A. As shown in FIGS. 3A and 3B, at the peripheral part of a main surface of the sheet-like heat exchanger 24, a high-density portion 26 is formed along the entire perimeter of the peripheral part. Such can be formed by, for example, performing compression molding of the porous metal member having the three-dimensional mesh structure by means of press working. That is, the porous member which is to serve as the heat exchanger 24 is partially pressed with a mold having a predetermined pattern, and the size (i.e., the thickness) of the porous member is thereby reduced as compared to the remaining part of the porous member against which the mold is not pressed. As a result, the high-density portion 26 is formed. In this portion, since voids are decreased than in the above-noted remaining part, the density of the material (metal) is increased, and rigidity is enhanced. Here, the direction in which the heat exchanger is compressed is not particularly limited. For example, in the heat exchanger 24 which is not particularly limited so long as the direction is perpendicular to a surface in contact with the case 12, a direction in which a gas inflow surface and a gas outflow surface face each other may be the compression direction. For example, when the heat exchanger 24 is mounted in a manner blocking the exhaust port of the case 12, the heat exchanger may be compressed in a direction perpendicular to the surface of the heat exchanger 24 facing the outside of the case 12. Further, when the heat exchanger is provided inside a duct portion such as an exhaust gas passage portion, the heat exchanger may be compressed in the direction of extension of the passage. When using a metal porous member having a three-dimensional mesh structure, or more specifically, a foam metal, by performing compression molding of a part thereof, crushing of the pores and an increase in density are easily achieved. Using the above-described heat exchanger 24, it is possible to suppress an increase in the space required for mounting a heat exchanger to the case 12, and to attain a component strength that allows reduction in use of reinforcing members for supporting the heat exchanger. Further, by fixing the heat exchanger 24 to the case 12 using the peripheral high-density portion 26, deformation of the heat exchanger is suppressed and mounting is facilitated. In the heat exchanger 24, the remaining portion other than the high-density portion 26 serves as a flow path through which high-temperature gas passes. In the high-density portion 26 at the peripheral part, the density may be increased by compressing from the periphery. In the high-density portion 26, the density may be twice or more that of the other portions, and depending on the original porosity, compression may be performed by about five times. Further, a boundary portion between the high-density portion 26 and the remaining portion may be stepped or sloped. This boundary portion may be formed at only one face or both faces among the two end faces in the compression direction.

In FIGS. 3A and 3B, the high-density portion 26 is formed not only at the peripheral part but also extending inward, in a cross shape, on the main surface of the heat exchanger 24. The inward high-density portion 26 can be formed in various patterns, which may for example be a pattern extending to connect corners of a rectangular shape. The high-density portion 26 located inward from the peripheral part may be formed so as to connect two opposite sides of the peripheral part, whereby the strength of the heat exchanger 24 as a whole can be enhanced. The high-density portion 26 is not necessarily formed at the peripheral part, and may be formed only at positions inward from the peripheral part. Further, in the heat exchanger, the shape of the inflow surface and the outflow surface for high-temperature gas (i.e., the main surfaces in the case of a sheet-like heat exchanger) is not limited to a rectangular shape, and may be triangular, hexagonal, circular, oval, or elliptical.

Figure 4A:
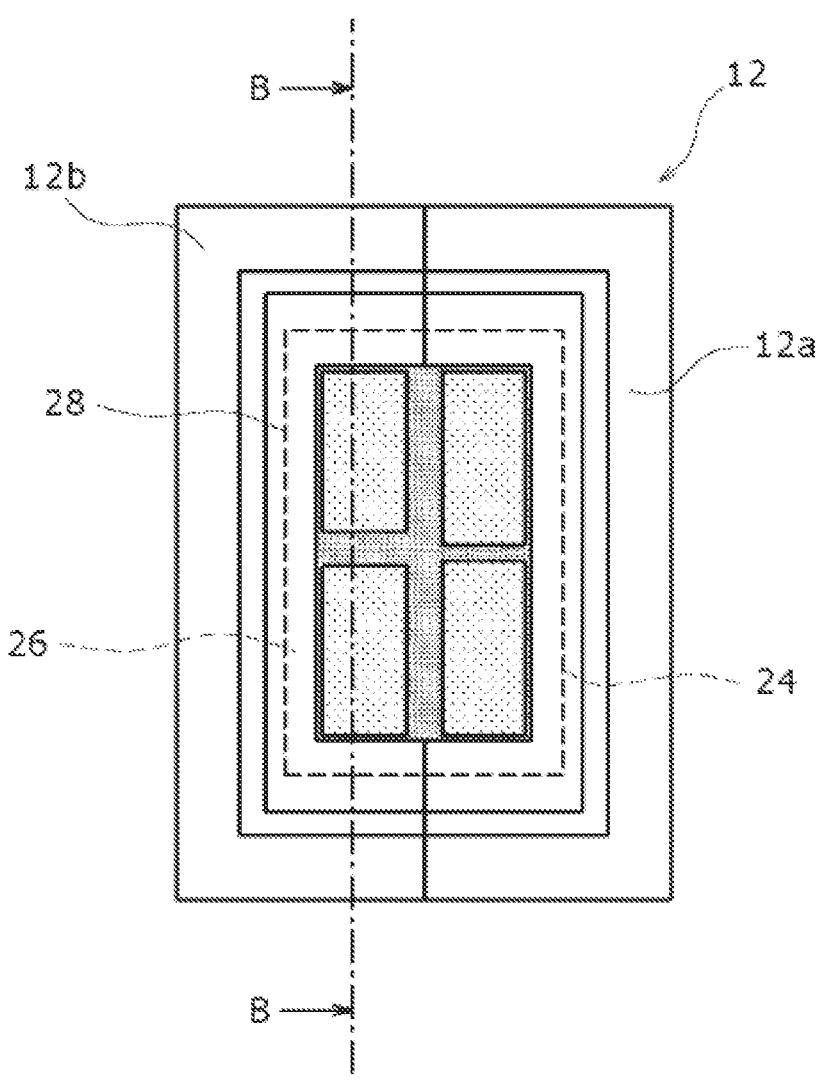
FIG. 4A is a diagram illustrating a configuration for fixing the heat exchanger to a case.
Figure 4B:
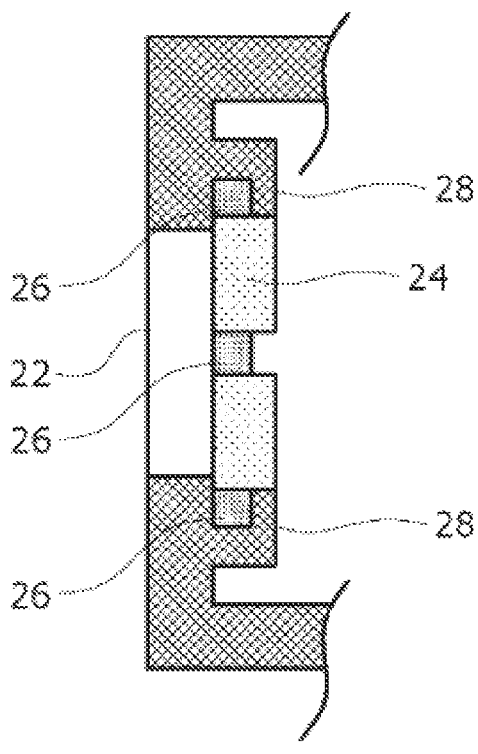
FIG. 4B is a cross-sectional view of the configuration for fixing the heat exchanger to the case, which is taken along cutting line B-B in FIG. 4A.

FIG. 4A is a plan view showing an example configuration for fixing the heat exchanger 24 to the case 12, and FIG. 4B is a cross-sectional view of the heat exchanger 24 and the case 12, which is taken along cutting line B-B in FIG. 4A. In FIGS. 4A and 4B, a hook portion 28 is provided protruding from the inner surface of the case 12 around the exhaust port 22. After protruding from the inner surface of the case 12, this hook portion 28 extends inward and abuts on the high-density portion 26 (or covers the high-density portion 26). Accordingly, by using this inwardly-extending portion to lock the peripheral high-density portion 26 of the heat exchanger 24, the heat exchanger can be fixed to the case 12. In particular, in this example, since the case 12 is divided into two, the heat exchanger 24 can be fixed by being inserted first into the hook portion 28 on one of the half cases 12a, 12b of the case 12, and subsequently into the hook portion 28 on the other of the half cases 12a, 12b of the case 12. Various known means can be used for fixing the heat exchanger 24. In retaining the heat exchanger 24 in the case 12, when the high-density portion 26 is held, a part on the side of the retaining member such as the case 12 can be received in the high-density portion 26, which is recessed in the heat exchanger. Therefore, the space required for retaining the heat exchanger 24 in the case 12 can be reduced. In the battery pack 10 of the present disclosure, even when a portion other than the high-density portion 26 is held in retaining the heat exchanger 24, the effect of increasing the rigidity of the heat exchanger can be obtained. The hook portion provided on the case 12 may cover the entire perimeter of the peripheral part of the heat exchanger, or may partially cover the peripheral part of the heat exchanger.

By increasing the rigidity of a part of the heat exchanger 24 composed of a foam metal member as described above, resistance to pressure inside the pack and efficient heat exchange can both be achieved without increasing the thickness or adding a reinforcing member. It is noted that the heat exchanger of the present disclosure has a predetermined rigidity without being reinforced by a reinforcing member. However, needless to mention, a reinforcing member may be used for the heat exchanger in the battery pack 10 of the present disclosure.

The exhaust port 22 of the case 12 may be a through hole provided in advance, or may be a weak portion formed so as to open first when gas is generated in the battery pack 10. Further, the exhaust port 22 may be a portion which is not intentionally formed but is confirmed, by experiment or the like, as being a site from where the gas is easily released to the outside.

Figure 5:
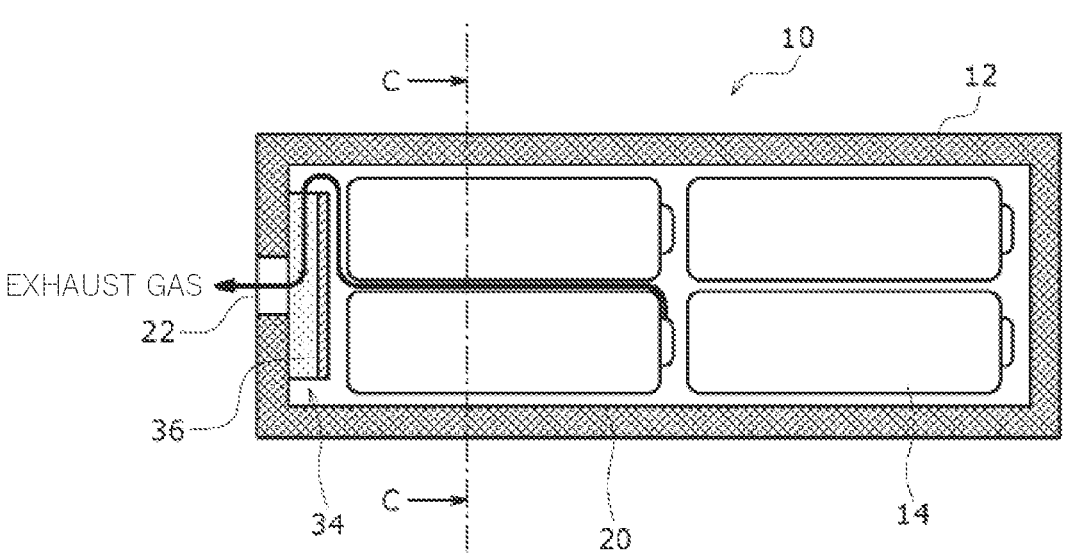
FIG. 5 is a diagram showing an overall configuration of a battery pack according to another example embodiment.
Figure 6A:
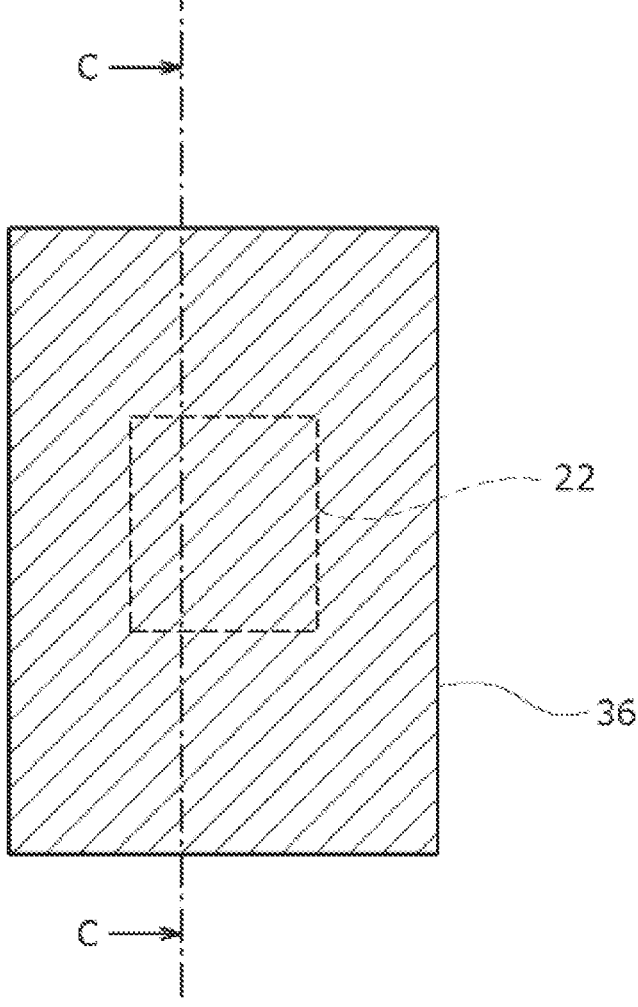
FIG. 6A is a plan view of another example heat exchanger.
Figure 6B:
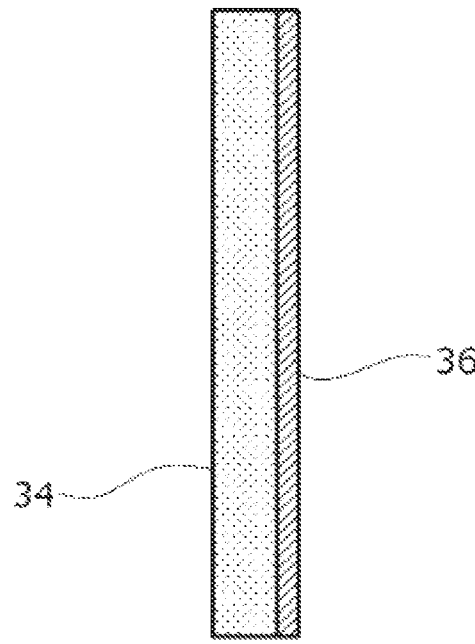
FIG. 6B is a diagram showing cross section C-C of the heat exchanger in FIG. 6A.

FIG. 5 is a diagram showing an overall configuration of a battery pack 10 according to another example embodiment. FIG. 6A is a plan view of another example heat exchanger 34, and FIG. 6B is a cross-sectional view of the heat exchanger 34, which is taken along cutting line C-C in FIG. 6A. As shown, on a surface (i.e., an inner surface) facing the internal space of the case 12, a shielding portion 36 that closes the pores is formed. Here, by having the shielding portion 36 provided on an inner surface, among the inner surfaces, that is located at an end of the porous material in the direction of the smaller dimension thereof, the flow path can be regulated more effectively. Therefore, while it is most effective to provide the shielding portion 36 on the inner surface located at the end of the porous material in the direction of the smallest dimension thereof (i.e., the thickness direction when the porous material is sheet-like), in the battery pack 10 of the present disclosure, it is not a requirement that the shielding portion 36 is always provided on the inner surface located at the end of the porous material in the direction of the smallest dimension thereof. Particularly when the porous material is sheet-like, the shielding portion 36 may be formed on the inner surface located at the end in the thickness direction while an annular inner surface located at the peripheral edge of the porous material is exposed to the internal space. The heat exchanger 34 may be formed larger than the opening of the exhaust port 22. With this arrangement, in the heat exchanger 34, the pores at the opposite surface located opposite to the inner surface on which the shielding portion 36 is formed are shielded by the outer wall 16 of the case 12. For this reason, gas flowing through the heat exchanger 34 tends to flow between the shielding portion 36 and the outer wall 16. Therefore, gas flow is more easily regulated. At the opposite surface of the heat exchanger 34 located opposite to the inner surface on which the shielding portion 36 is formed as described above, by configuring such that the pores in a region that is opposed to a part of the inner surface where the shielding portion 36 is not formed are blocked by a separate member (e.g., the outer wall of the case or an exhaust gas passage), the gas path can be regulated more effectively. Further, a shielding portion 36 identical to the shielding portion 36 provided on the inner surface may be formed on the above-noted opposite surface. The heat exchanger 34 may be fixed with an adhesive or the like to the outer wall 16 of the case 12 around the exhaust port 22. For fixing the heat exchanger 34 to the case 12, various methods can be used, such as a method in which a hook portion is provided on the outer wall 16 of the case 12 and this hook portion is engaged with the heat exchanger 34 to fix the heat exchanger 34. In particular, in this example, since the case 12 is divided into two half cases 12a and 12b, the heat exchanger 34 can first be set in one of the half cases, and subsequently the other of the half cases can be attached. In cases where the heat exchanger 34 is to be arranged in the exhaust gas passage 20, a partition wall (not shown in drawing) which partitions the exhaust gas passage 20 into a plurality of chambers and which has a through hole may be further provided in the exhaust gas path, and the heat exchanger 34 may be mounted to this partition wall. With this arrangement, the same advantageous effects can be obtained as in the configuration in which the heat exchanger 34 is provided at the exhaust port 22.

In FIGS. 6A and 6B, the entire inner surface of the heat exchanger 34 is configured as the shielding portion 36. Therefore, gas enters from a side face of the heat exchanger 34 and exits from the part facing the exhaust port 22. As a result, the length of the flow path inside the heat exchanger 34 is increased, and heat exchange with the gas is effectively performed.

The shielding portion 36 may be formed by a method involving: attaching, to a surface of the porous material, a non-porous film or non-porous plate made of a refractory material such as a metal foil; applying a highly heat-resistant coating, such as one containing ceramics, so as to block the pores; filling the pores with a filler; crushing the pores by performing an additional processing on the surface of the porous material; melting and re-solidifying the skeleton parts of the porous material; or the like.

Figure 7A:
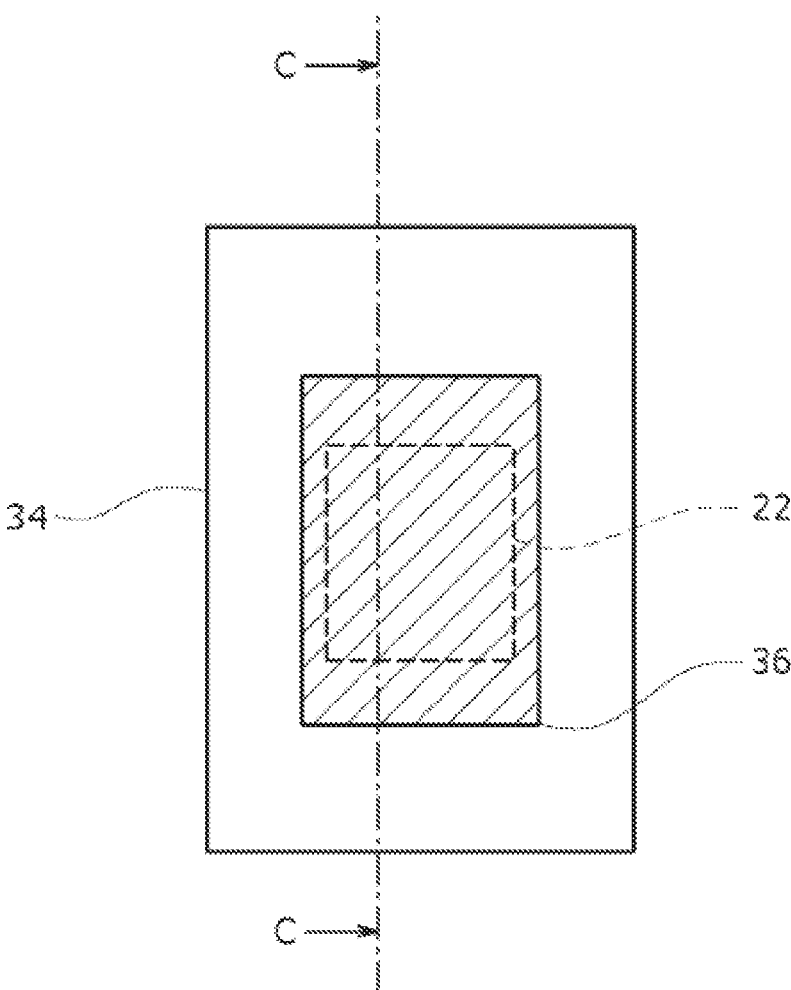
FIG. 7A is a plan view of another example heat exchanger.
Figure 7B:
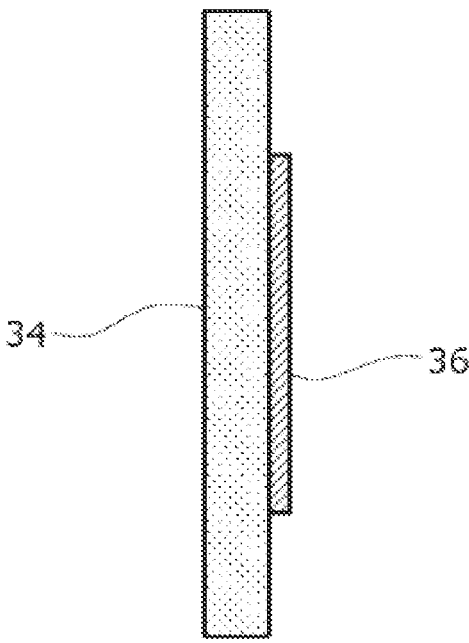
FIG. 7B is a diagram showing cross section C-C of the heat exchanger in FIG. 7A.

FIG. 7A is a plan view of another example heat exchanger 34, and FIG. 7B is a cross-sectional view of the heat exchanger 34, which is taken along cutting line C-C in FIG. 7A. In FIGS. 7A and 7B, on the surface of the heat exchanger 34, a shielding portion 36 is formed at a position facing the exhaust port 22 and a region around that position. In other words, the shielding portion 36 is formed partially on the inner surface. In this arrangement, not only the side face of the heat exchanger 34 but also the peripheral portion of the surface can be used as the gas path, and, at the same time, gas can be inhibited from passing through the heat exchanger 34 via a short path. Here too, the pores at the opposite surface located opposite to the inner surface of the porous material on which the shielding portion 36 is partially provided may be blocked by being shielded by the outer wall 16 of the case 12, the partition wall of the exhaust gas passage, a shielding portion 36, or the like. In that case, the outer wall 16 of the case 12 located at the above-noted opposite surface, the partition wall of the exhaust gas passage, or the shielding portion 36 may include a part that overlaps the shielding portion 36 provided on the inner surface. With this arrangement, gas flowing in the heat exchanger 34 can be easily caused to follow a roundabout path.

As such, in the battery pack 10 according to the present disclosure, the heat exchanger 34 arranged at the exhaust port 22 has a structure in which at least a part of a surface of the heat exchanger 34 does not allow passage of exhaust gas, and heat exchange efficiency of the heat exchanger 34 is thereby increased.

Accordingly, by hindering entry of high temperature gas into the surface of the porous material which serves as the entrance to a shorter path for passing through the porous material, a longer contact path for heat exchange can be formed without significantly increasing the size of the porous material. Therefore, a highly safe battery pack 10 can be provided without reducing the volumetric energy density of the battery pack 10 or increasing component cost.

Figure 8:
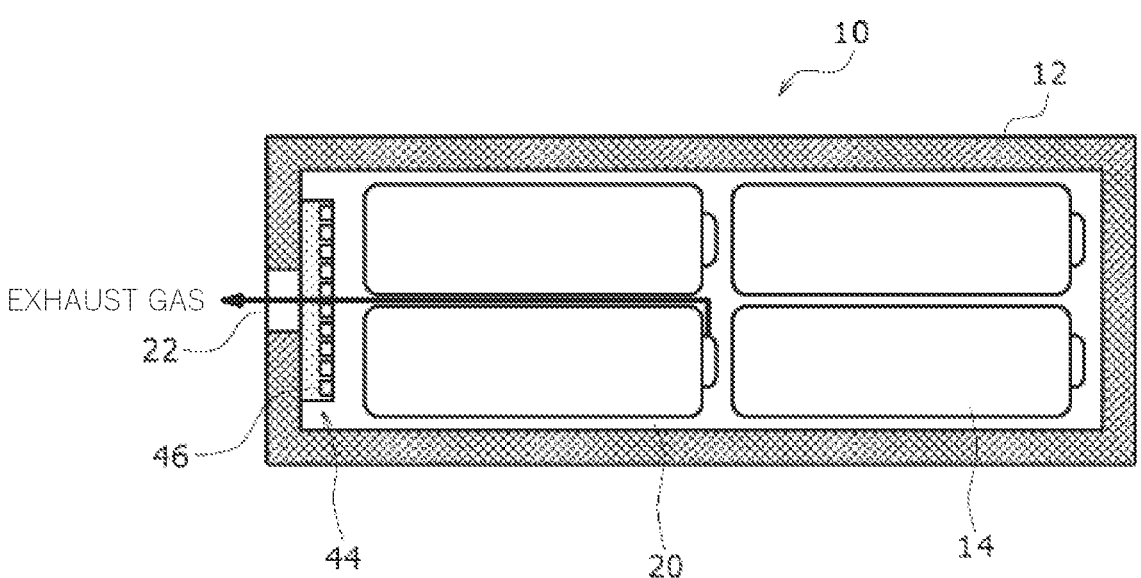
FIG. 8 is a diagram showing an overall configuration of a battery pack according to another example embodiment.
Figure 9:
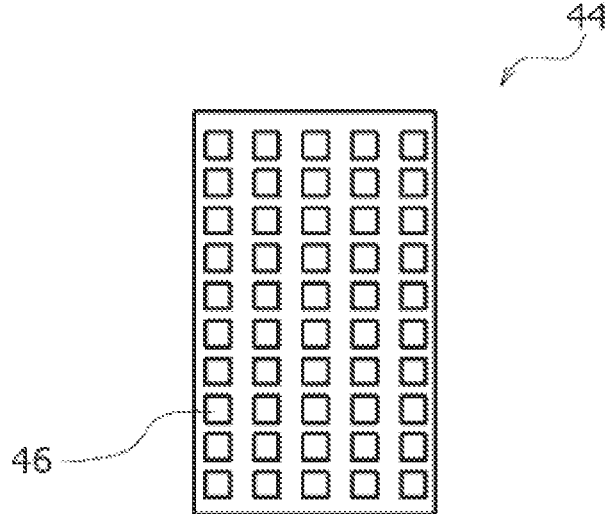
FIG. 9 is a plan view of another example heat exchanger.

FIG. 8 is a diagram showing an overall configuration of a battery pack 10 according to another example embodiment. FIG. 9 is a plan view of a heat exchanger 44. As shown in FIG. 9, in the surface toward the internal space of the case 12, a large number of recesses 46 are formed for receiving ejected matters, and the surface is uneven. As shown in FIG. 8, the heat exchanger 44 is arranged so that the surface in which the recesses 46 are formed faces the inside of the case 12. The heat exchanger 44 is larger than the exhaust port 22, and the peripheral part of the heat exchanger 44 is preferably fixed to the case 12 at around the exhaust port 22 with an adhesive or the like. For fixing the heat exchanger 44 to the case 12, various methods can be used, such as a method in which a hook portion is provided on the case 12 side and the hook portion is engaged with the heat exchanger 44 to fix the heat exchanger 44. In particular, in this example, since the case 12 is divided into two, the heat exchanger 44 can be fixed while the case 12 is in a split state.

Here, much of the ejected matters contained in the gas have a size of about several hundred μm, so that each recess 46 preferably has an entrance opening size of 1 mm or more and a depth of 1 mm or more. While some ejected matters may have a size up to several mm, there is no problem even when those cannot be received in the recesses 46.

As viewed from the internal space side, the ratio of the opening area of the recesses 46 to the area of the inner surface is preferably about 10 to 50%, and the recesses are preferably evenly distributed at equal intervals. If the ratio is 10% or less, there results an increase, and if the ratio is 50% or more, the gas passing distance in the entire heat exchanger 44 tends to become small. The bottom portion of the recesses 46 must then be made thicker so that the heat exchanger 44 can perform sufficient cooling.

Figure 10A:
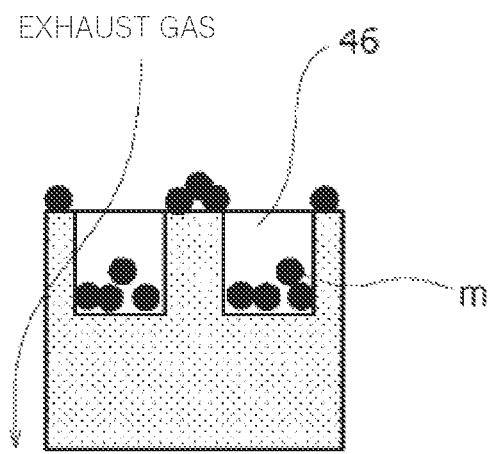
FIG. 10A is a cross-sectional view showing an example shape of recesses formed in a heat exchanger.

FIG. 10A is a cross-sectional view showing an example shape of the recesses 46 in part. FIG. 4B is a cross-sectional view showing, in part, recesses 46 that are wider toward the inside (or bottom), and FIG. 4C is a cross-sectional view showing, in part, a heat exchanger 44 in which tips of wall portions (or projections) located between adjacent recesses 46 are chamfered in a round shape. Although the shape of the recesses 46 is shown as a rectangular tube shape, the shape may alternatively be a cylindrical shape or a shape of a polygonal tube other than a rectangular tube. The recesses 46 can be formed by, for example, compression molding performed by means of press working. The recesses 46 can be formed by pressing a predetermined mold against the heat exchanger 44 from the surface side. When the mold is pressed in to the extent that the recesses 46 are formed, the pores can be maintained. Further, the recesses 46 may have a shape of a groove extending on the surface of the heat exchanger 44.

As shown in FIG. 10A, by forming the recesses 46, the ejected matters m can be accumulated at the bottom of the recesses 46 and on the non-recessed portions (i.e., the end faces of the wall portions) of the inner surface, and the side walls of the recesses 46 can be used as the exhaust gas flow path. It is therefore possible to suppress an increase in gas pressure loss that would result when the surface of the heat exchanger 44 is clogged by the ejected matters m.

Figure 10B:
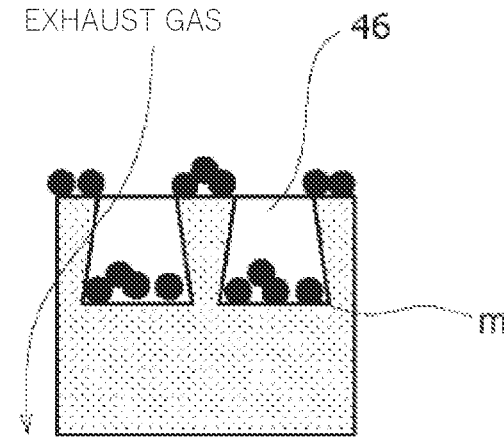
FIG. 10B is a cross-sectional view showing another example shape of the recesses.

In FIG. 10B, the bottom surface of each recess 46 is wider than its entrance. Accordingly, among the inner surfaces of the recess 46, areas where the ejected matters m are accumulated are easily reduced by means of the narrow openings of the recesses 46. Meanwhile, among the inner surfaces of the recesses, areas where the ejected matters m are less likely accumulated are increased. In the recesses 46 of FIG. 10B, in contrast to in the recesses 46 of FIG. 10A, the volume of the ejected matters m accumulated at the bottom can be suppressed at a part not overlapping the opening of the recess 46 as compared to at a part overlapping the opening of the recess 46. Space for gas passage in the heat exchanger 44 can therefore be maintained. Such recesses 46 can be formed by first forming straight recesses 46 as those in FIG. 10A, and subsequently pushing the remaining projections from above to spread them out sideways, or pushing and widening the bottom part of the recesses 46.

Figure 10C:
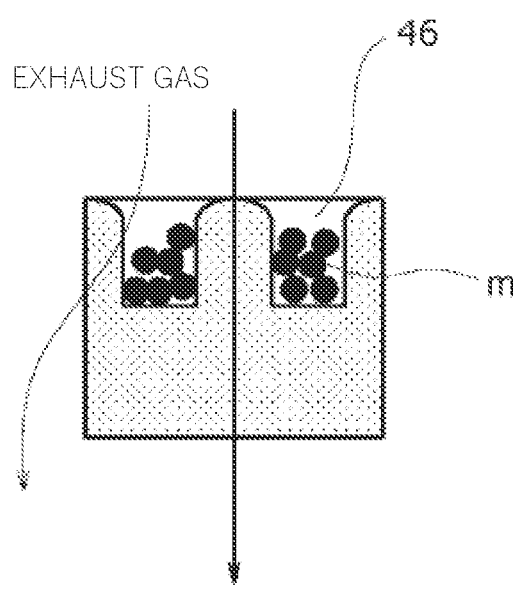
FIG. 10C is a cross-sectional view showing an example in which tips of wall portions (or projections) located between adjacent recesses in a heat exchanger are chamfered in a round shape.

In FIG. 10C, by chamfering, in a round shape, the tips (or end faces) of the projections between the recesses 46, the ejected matters m that deposited on the chamfered portions do not stay on the chamfered portions, but move toward the bottom part of the recesses 46. The ejected matters m thus tend not to accumulate on the end faces of the projections. For this reason, the pores at the end faces are less likely to be clogged by the ejected matters m, and passage of the exhaust gas through the surface can be effectively carried out. When the projections are to be chamfered, the chamfering may be performed by forming sloped surfaces.

A configuration obtained by combining the features of FIGS. 10B and 10C can also be employed. By providing such recesses 46, the ejected matters m can be received in the recesses 46 while the exhaust gas can pass through the side faces of the recesses 46. Accordingly, the surface area of the heat exchanger 44 can be substantially increased, and passage of the gas can be carried out efficiently.

By providing the recesses 46 as described above, clogging of the heat exchanger 44 due to the ejected matters m can be suppressed. Accordingly, gas pressure loss due to clogging can be suppressed. For this reason, it is possible to use a heat exchanger member having a fine structure, which has a high cooling efficiency. Therefore, it is unnecessary to significantly increase the volume of the heat exchanger 44, and a safe battery pack 10 can be provided without reducing the volumetric energy density of the battery pack 10 or increasing component cost.

REFERENCE SIGNS LIST

10 battery pack; 12 case; 12a, 12b half case; 14 battery; 16 outer wall; 18 receiving portion; 20 exhaust gas passage; 22 exhaust port; 24 heat exchanger; 26 high-density portion; 28 hook portion; 34 heat exchanger; 36 shielding portion; 44 heat exchanger; 46 recess; m ejected matter.

The invention claimed is:

1. A battery pack that houses a secondary battery inside a case, comprising:
    an exhaust part, by means of which an internal space of the case where the secondary battery is housed is in communication with outside, and which allows a gas discharged from the secondary battery to be discharged from the internal space to the outside; and a heat exchanger, which is provided at the exhaust part and formed of a porous material having a three-dimensional mesh structure, and through which the gas passes,
    wherein
        assuming that a predetermined direction is a first direction, the heat exchanger comprises a high-density portion having a size in the first direction that is smaller than that of a remaining portion and having a density higher than that of the remaining portion, and
        the high-density portion is fixed to the case.

2. The battery pack according to claim 1, wherein
    the exhaust part comprises an exhaust port that opens to the outside of the case, and
    the heat exchanger is fixed to the case in a manner blocking the exhaust port.

3. The battery pack according to claim 1, wherein
    the exhaust part comprises an exhaust port that opens to the outside of the case, and a duct portion connecting between the exhaust port and the internal space; and
    the heat exchanger is fixed to the case in a manner blocking the duct portion.

4. The battery pack according to claim 1, wherein
    the high-density portion is provided at peripheral parts of a pair of end faces in the first direction.

5. The battery pack according to claim 1, wherein
    the high-density portion is provided along an entire perimeter of a peripheral part of the heat exchanger.

6. The battery pack according to claim 1, wherein
    at an end face, in the first direction, of the heat exchanger, the high-density portion is provided at a position inward from a peripheral part.

7. The battery pack according to claim 1, wherein
    the high-density portion is provided along an entire perimeter of a peripheral part of the heat exchanger, and an inward segment of the high-density portion is further provided, which has two ends connected to the peripheral high-density portion.

8. The battery pack according to claim 1, wherein
    the case covers an end face, in the first direction, of the high-density portion.

9. A battery pack that houses a secondary battery inside a case, comprising:
    an exhaust part, by means of which an internal space of the case where the secondary battery is housed is in communication with outside, and which allows a gas discharged from the secondary battery to be discharged from the internal space to the outside; and
a heat exchanger, which is provided at the exhaust part and formed of a porous material having a three-dimensional mesh structure, and through which the gas passes,
wherein
    the heat exchanger comprises a shielding portion that blocks pores located at an inner surface of the porous material facing the internal space.

10. The battery pack according to claim 9, wherein
    the shielding portion is formed on the inner surface at a position facing the exhaust port.

11. The battery pack according to claim 9, wherein
    the shielding portion is a non-porous plate that covers a surface of the porous material.

12. The battery pack according to claim 9, wherein
    the shielding portion is a filler received in the pores of the porous material.

13. The battery pack according to claim 9, wherein the shielding portion is formed by fusing together skeleton parts that constitute the three-dimensional mesh structure in the porous material.

14. The battery pack according to claim 9, wherein in the porous material, pores at a surface located opposite to a surface on which the shielding portion is provided are blocked.

15. The battery pack according to claim 9, wherein the porous material is sheet-like, and the shielding portion is formed on a surface located at one end, in a thickness direction, of the porous material.

16. The battery pack according to claim 9, wherein the porous material has, at a face located opposite to a surface on which the shielding portion is formed, a region in which pores are blocked, and at least a part of the region in which the pores are blocked overlaps the shielding portion.

17. A battery pack that houses a secondary battery inside a case, comprising:

an exhaust part, by means of which an internal space of the case where the secondary battery is housed is in communication with outside, and which allows a gas discharged from the secondary battery to be discharged from the internal space to the outside; and a heat exchanger, which is provided at the exhaust part and formed of a porous material having a three-dimensional mesh structure, and through which the gas passes, wherein at least one recess is formed in a surface of the heat exchanger facing the internal space.

18. The battery pack according to claim 17, wherein the at least one recess has an opening size of 1 mm or more and a depth of 1 mm or more.

19. The battery pack according to claim 17, wherein when the surface is viewed from the internal space side, a ratio of an area of the at least one recess to an area of the surface is 10 to 50%.

20. The battery pack according to claim 17, wherein a bottom part of the at least one recess is wider than an entrance of the at least one recess.

21. The battery pack according to claim 17, wherein a tip of a wall portion located between recesses, which correspond to the at least one recess, is chamfered.

* * * * *